Patented July 1, 1941

2,247,918

UNITED STATES PATENT OFFICE 2,247,918

VULCANIZATION OF RUBBER

Joy G. Lichty, Stow, Ohio, assignor to Wingfoot Corporation, Wilmington, Del., a corporation of Delaware No Drawing. Application April 30, 1936, Serial No. 77,220

10 Claims. (Cl. 260—787)

This invention relates to the vulcanization of rubber. More particularly it relates to the acceleration of the vulcanization of rubber by the use of compounds derived from mercapto-aryl thiazoles and certain poly halogen ketones.

It is known that mercaptoaryl thiazole derivatives of mono- and dichlor-acetones are useful as accelerators of vulcanization. This is described in British Patent 360,491, issued November 9, 1931. It has now been discovered that accelerators definitely superior to those previously described are obtained by employing a polychlor ketone having the formula

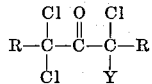

in which Y is chlorine or hydrogen, and the R's are either aliphatic, aromatic or hydrogen radicals. In other words, these new accelerators are mercaptoaryl thiazole derivatives of alpha polychlor ketones containing from three to four chlorine atoms but not more than two chlorine atoms on the same carbon atom.

In one method of preparing these accelerators, the polychlor ketone is treated with a reactive metal salt of the mercapto aryl thiazole. In the resulting reaction, the chlorine atoms in the polychlor ketone are believed to be replaced by arylthiazyl-thio-groups to yield accelerators of the probable formula

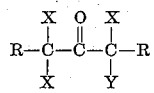

in which each X is an arylthiazyl-thio-group having the formula

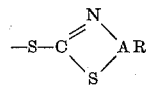

AR being aryl, Y is an arylthiazyl-thio-group or hydrogen, and each R is either aliphatic, aromatic or hydrogen.

The practice of the invention may be demonstrated by the preparation of the mercaptobenzothiazole derivative of a poly chlor acetone prepared by the following method:

A mixture of 464 grams of acetone, 10 cc. of methyl alcohol, and 300 grams of calcium carbonate was placed in a three liter round bottom flask fitted with an inlet tube, a reflux condenser, and a stirring device. Chlorine was then bubbled into the mixture and water was added from time to time to dissolve the calcium chloride formed. Also, a total of 780 grams more calcium carbonate was added during the reaction. The total amount of water added was approximately one and a half liters. The first stage of the chlorination was conducted with cooling but later the reaction proceeded better at a temperature of about 50° C. The reaction was stopped at the end of 40 hours. The aqueous solution was extracted with ether and dried with calcium chloride. Distillation gave two fractions as follows:

```
                                                    Grams
Fraction 1, B. P. 115–125° C_____ 459
Fraction 2, B. P. chiefly 96° C./60 mm_____ 170
```

The analysis of fraction 1 showed that it was dichloracetone. Fraction 2 had a specific gravity of 1.45 at room temperature and had, by analysis, a chlorine content of 60 percent. It is believed to be either a constant boiling mixture of dichlor acetone and higher polychloracetones, such as α, α, α' tri chloracetone and α, α, α', α' tetrachloracetone, or a hydrate of α, α, α' trichloracetone. Fraction 2 also did not hydrolyze readily as do poly chlor acetones having three chlorines attached to one carbon atom.

A 16.2 gram portion of fraction 2 was added with stirring to 0.3 mol of sodium benzothiazyl mercaptide in aqueous solution. A pasty product separated. This solidified on standing, when it was removed and dried. The product, which melted at 60–95° C., was very soluble in benzene, showing that it contained little or no free mercaptobenzothiazole or sodium benzothiazyl mercaptide. The yield was quantitative, assuming the poly chloracetone to be trichloracetone monohydrate.

Other accelerators of the invention may be similarly prepared by substituting other mercaptoarylthiazoles, preferably in the form of their alkali metal salts, and suitable polychlorketones for the mercaptobenzothiazole and polychloracetone of the example.

Exemplary of the mercaptoarylthiazoles are 1-mercaptonaphthothiazole, 1-mercapto 5-nitrobenzothiazole, 1-mercapto 5-chlorbenzothiazole, 1-mercapto 3, 5 dichlorbenzothiazole, 1-mercapto 3-methyl benzothiazole, 1-mercapto 5-ethoxy benzothiazole, 1-mercapto 4-nitro 5-chlor benzothiazole, 1-mercapto 3-hydroxy benzothiazole, 1-mercapto 3 phenyl benzothiazole, the 1-mercapto xylyl thiazoles and other alkyl-, aryl-, aralkyl-, nitro, halo-, hydroxy- and alkoxy 1-mercapto arylene thiazoles of the benzene and naphthalene series.

The polychlorketones of the invention, as previously defined include α, α, α' trichloracetone, α, α, α', α' tetrachloracetone, α, α, α' trichlor diethyl ketone, α, α, α', α' tetrachlor methyl ethyl ketone, α, α, α' trichlor dibenzyl ketone, α, α, α', α' tetrachlor benzyl propyl ketone, etc. The acetones are preferred, however, and, of these, α, α, α' trichlor acetone.

Other polyhalogen ketones may also be used in the practice of the invention. For example, the chlorine of the foregoing illustrative compounds and preparations may be replaced by other halogen, such as bromine.

The reaction products of the invention may also be prepared by variations of the process. For example, other reactive salts of the mercaptoarylthiazoles may be employed in place of the sodium salt. Also, it is possible to use the mercaptoaryl thiazole directly by reacting it with the polychlorketone in the presence of sodium carbonate or other acid absorbing material. It is intended to include the reaction products as defined or any mixtures of them, prepared by any method whatsoever.

The accelerators of the invention may be used in most of the usual rubber compounding formulae. The following is one formula in which they have been found by test to yield excellent results:

| | Parts by weight |
|---|---|
| Extracted pale crepe | 100 |
| Zinc oxide | 5 |
| Sulfur | 3 |
| Stearic acid | 1.5 |
| Accelerator | 0.5 |

The previously described derivative of sodium benzothiazyl mercaptide and polychloracetone was incorporated into rubber in accordance with this formula. Samples were cured and tested, yielding the following results:

| Cure in mins., °F. | Tensile, kgs./cm.$^2$ | Ultimate elongation, percent | Modulus, kgs./cm.$^2$ | |
|---|---|---|---|---|
| | | | 500% | 700% |
| 20/285 | 34 | 840 | 8 | 17 |
| 40 | 43 | 740 | 13 | 34 |
| 60 | 67 | 760 | 16 | 45 |
| 80 | 68 | 740 | 19 | 53 |

Other samples were compounded in accordance with the same formula with the addition of 0.2 part by weight of diphenyl guanidine. The following results were obtained:

| Cure in mins., °F. | Tensile, kgs./cm.$^2$ | Ultimate elongation, percent | Modulus, kgs./cm.$^2$ | |
|---|---|---|---|---|
| | | | 500% | 700% |
| 10/260 | 54 | 790 | 12 | 35 |
| 20 | 164 | 775 | 28 | 107 |
| 40 | 237 | 745 | 45 | 187 |
| 60 | 238 | 720 | 53 | 212 |
| 80 | 245 | 720 | 55 | 214 |

These data demonstrate the excellent accelerating properties of the new accelerators, particularly when they are employed in conjunction with a basic nitrogen-containing accelerator, such as diphenylguanidine. In this latter case, exceptionally high tensile strengths are obtained in a very short time. Also, they have an excellent delayed action.

Other basic nitrogen-containing accelerators which may be used in the practice of the invention in place of diphenyl guanidine are ammonia, 2—4 diamino diphenyl amine, p—p' diamino diphenyl methane, diphenyl guanidine neutral succinate, diphenyl guanidine neutral phthalate, the acid and neutral oxalic salts of diphenyl guanidine and di ortho tolyl guanidine, urea, dibenzyl amine, diortho tolyl guanidine, etc. Of these the diaryl guanidines are preferred.

Although only the preferred forms of the invention have been described in detail, it will be apparent to those skilled in the art that various modifications may be made therein without departing from the spirit of the invention or the scope of the appended claims, in which it is intended that the patent shall cover by suitable expression in such claims all features of patentable novelty residing in the invention.

What I claim is:

1. The method of treating rubber which comprises vulcanizing it in the presence of a ketone containing from three to four arylthiazyl-thio groups attached alpha to the carbonyl group, not more than two such arylthiazyl-thio groups being attached to the same carbon atom.

2. The method of treating rubber which comprises vulcanizing it in the presence of an acetone containing from three to four benzothiazyl-thio groups attached alpha to the carbonyl group, not more than two such benzothiazyl-thio groups being attached to the same carbon atom.

3. The method of treating rubber which comprises vulcanizing it in the presence of an $\alpha$, $\alpha$, $\alpha'$ tri (benzothiazyl-thio) ketone.

4. The method of treating rubber which comprises vulcanizing it in the presence of an $\alpha$, $\alpha$, $\alpha'$, $\alpha'$ tetra(benzothiazyl-thio) ketone.

5. The method of treating rubber which comprises vulcanizing it in the presence of $\alpha$, $\alpha$, $\alpha'$ tri(benzothiazyl-thio) acetone.

6. The vulcanizates obtained according to the process of claim 1.

7. The vulcanizates obtained according to the process of claim 2.

8. The vulcanizates obtained according to the process of claim 3.

9. The vulcanizates obtained according to the process of claim 4.

10. The vulcanizates obtained according to the process of claim 5.

JOY G. LICHTY.